United States Patent [19]
Yeager et al.

[11] Patent Number: 5,828,887
[45] Date of Patent: Oct. 27, 1998

[54] NETWORK BASED PROGRAM LOADER SYSTEM AND METHOD OF OPERATION

[75] Inventors: Jeffrey N. Yeager, Spring Hill; Aaron W. Marshall, Nashville; Joel R. Jensen, Franklin, all of Tenn.

[73] Assignee: Electronic Data Systems Corporation, Plano, Tex.

[21] Appl. No.: 654,064

[22] Filed: May 23, 1996

[51] Int. Cl.⁶ .................................................. G06F 9/06
[52] U.S. Cl. ...................... 395/712; 395/652; 395/200.5
[58] Field of Search ..................... 395/651, 652, 395/653, 200.5, 200.51, 200.52, 712, 680

[56] References Cited

U.S. PATENT DOCUMENTS

| | | |
|---|---|---|
| 5,325,532 | 6/1994 | Crosswy et al. .......................... 395/652 |
| 5,452,454 | 9/1995 | Basa ......................................... 395/652 |
| 5,548,729 | 8/1996 | Akiyoshi et al. .................. 395/200.52 |
| 5,574,915 | 11/1996 | Lemon et al. ........................... 395/651 |

*Primary Examiner*—Kevin A. Kriess
*Attorney, Agent, or Firm*—David G. Wille; L. Joy Griebenow

[57] ABSTRACT

A method for loading a software application for use at a client node (24, 30) of a network (12, 14) includes activating a program loader system (48) at the client node (24, 30). A user-specific software application setup file (56) is then transmitted from a file server (22, 28) to the client node (24, 30).

23 Claims, 2 Drawing Sheets

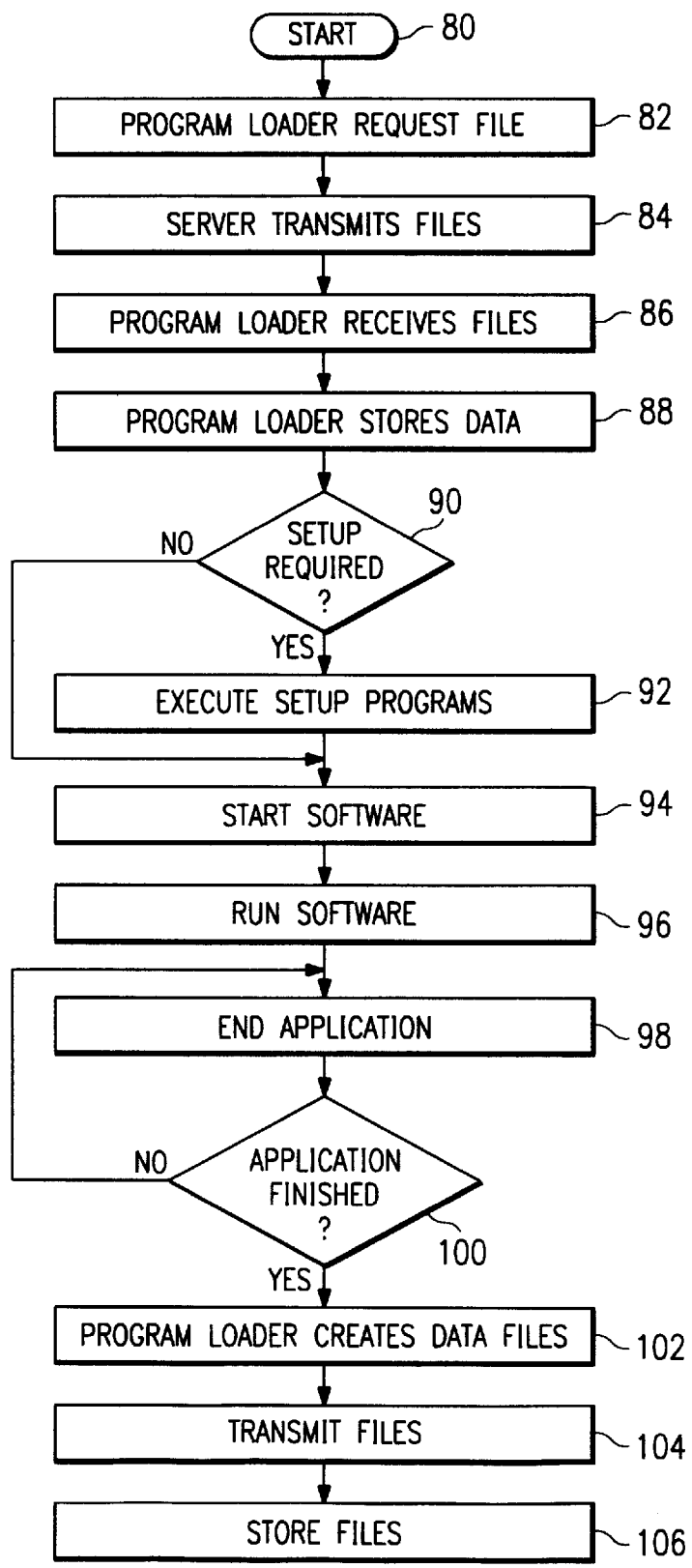

NETWORK BASED PROGRAM LOADER SYSTEM AND METHOD OF OPERATION

TECHNICAL FIELD OF THE INVENTION

This invention relates in general to the field of computer networks, and more particularly, to a system and method for loading programs for use at a client node on a computer network.

BACKGROUND OF THE INVENTION

A computer network may be formed by coupling processors, such as a personal computer, to a communications medium. Each processor coupled to the communications medium operates software systems independently of the other processors, but also maintains the ability to communicate with and transfer data to other processors. In addition, software systems operating on the processors may be designed to interface with each other, such that software operating on one processor may take partial or total control of the operation of one or more other processors.

The size of the network may be limited by the size and capacity of the communications medium. For example, a high-speed bus may be limited to a length of several hundred meters, while long distance telephone lines may be used to transmit data at lower speeds over transcontinental distances. A local area network (LAN) usually refers to a network that includes a high-speed communications medium with a relatively short length, and a wide-area network (WAN) usually refers to two or more LANs that couple to each other through "gateways" and lower speed data lines to communicate with one another. A gateway is a piece of data processing equipment that can transfer data from one communications medium to a second communications medium having the same or a different speed.

Methods are known for allowing processors connected to a communications medium to communicate. These methods are typically referred to as "network architectures." One important feature of networking processors is that a number of processors connected to a communications medium may communicate with each other without simultaneous use of the communications medium by the processors and subsequent distortion of data.

Although such network computer systems offer advantages, it is presently difficult or impossible for users of the computer network to "roam," i.e. to travel from the client node typically used by the user to a client node at a different location. For example, if a WAN user of a LAN in Dallas, Tex. travels to a LAN in Houston, Tex., the WAN user will not be able to "log on" to the WAN in Houston and receive the same computer services that the user receives in Dallas. Existing network architectures and network operating systems often limit the ability of users to roam because of restricted access to operating system data files and user-specific setup files, either due to network security configuration or physical restrictions.

SUMMARY OF THE INVENTION

Therefore, a need has arisen for a system and method for loading programs onto a processor that allows users to roam to any client node of a network and access user-specific setup files.

Accordingly, a system is provided that substantially eliminates or reduces disadvantages associated with prior systems and methods.

According to one embodiment of the present invention a method is provided for loading a software application for use at a client node of a network that includes requesting a file with user-specific software application setup data. This file of user-specific software application setup data is stored at a location where a user may access the file from any client node of the network.

One important technical advantage of the present invention is that a user from one client node of the network can travel to any other client node of the network and access the network without any reduction in service. User-specific software application setup data required for running network applications is stored at a server, and can be accessed from any client node on the network.

Another important technical advantage of the present invention is that any changes made to user-specific software application setup files when the user travels to a different client node are saved to a network server. Thus, such changes will not be lost if the user subsequently operates the software application from a different client node.

Yet another important technical advantage of the present invention is that any changes made to the data memory or operating system of the client node by a first user are restored prior to use of the client node by a subsequent user. Thus, the software setup for a resident user of a client node will not be disrupted if a roaming user temporarily uses the resident user's client node.

BRIEF DESCRIPTION OF THE DRAWINGS

For a more complete understanding of the present invention and advantages thereof, reference is now made to the following description taken in conjunction with the accompanying drawings, in which like reference numbers indicate like features and wherein:

FIG. 2 is a flowchart of the function and operation of a program loader system constructed in accordance with teachings of the present invention.

Figure 1:
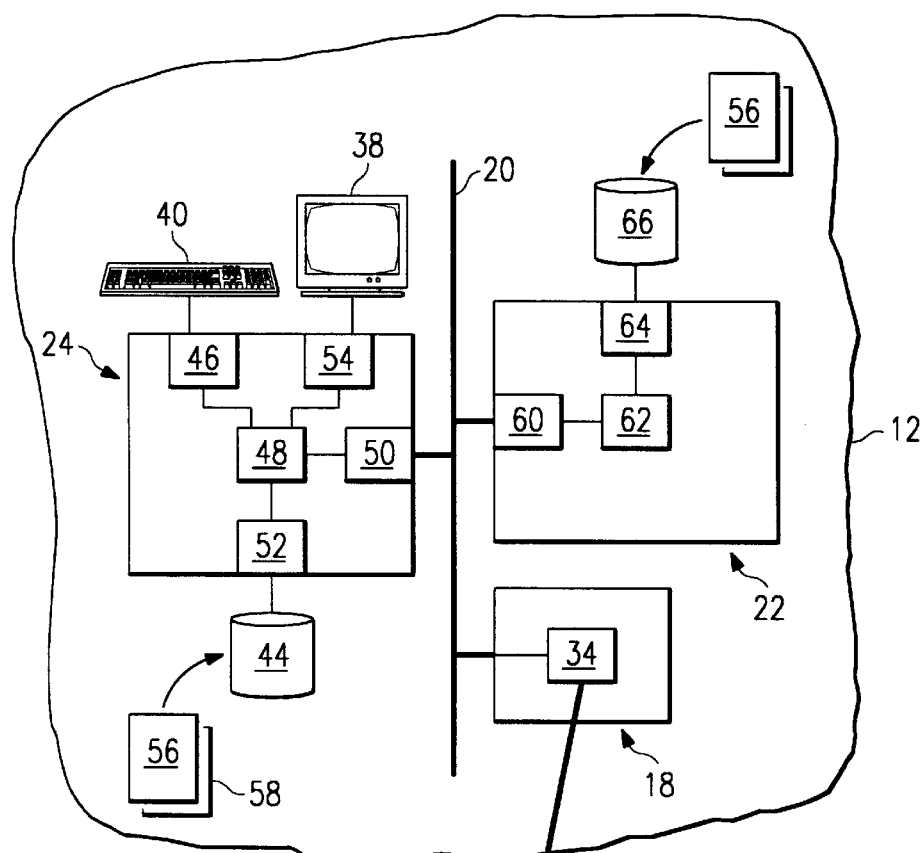
FIG. 1 is a schematic diagram of an exemplary WAN constructed in accordance with the teachings of the present invention.
Figure 1:
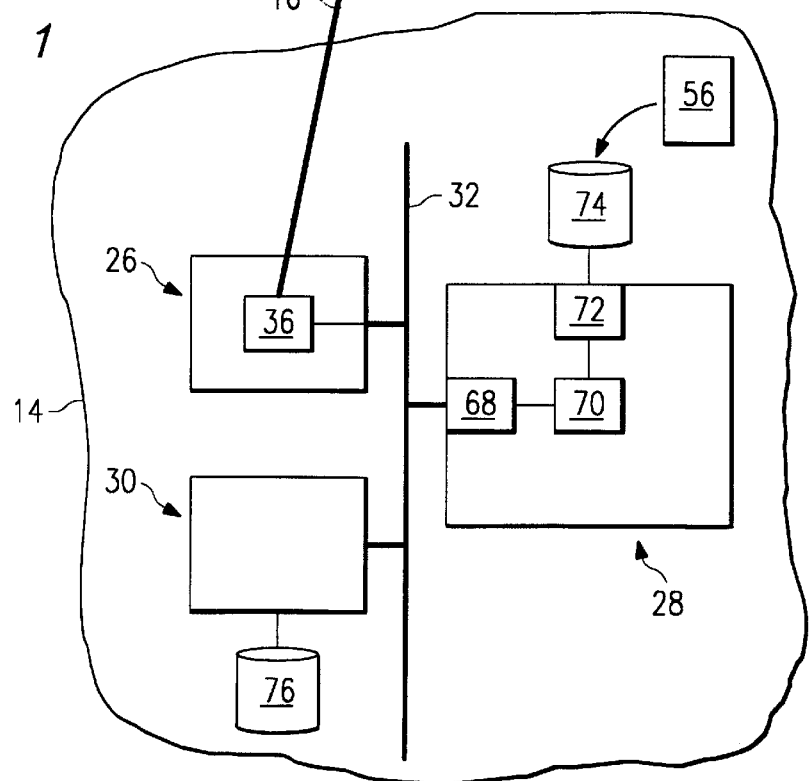

DETAILED DESCRIPTION OF THE INVENTION:

FIG. 1 is a schematic diagram of an exemplary WAN 10 constructed in accordance with the teachings of the present invention. WAN 10 includes LAN 12 and LAN 14, both of which couple to frame relay 16. LAN 12 includes gateway 18, which couples to frame relay 16 and twisted conductor pair 20. File server 22 and client node 24 are also coupled to twisted conductor pair 20 of LAN 12. Likewise, LAN 14 includes gateway 26, file server 28, and client node 30, each of which couple to twisted conductor pair 32.

Frame relay 16 is a dedicated communications medium that is used to transfer data between gateway 18 of LAN 12 and gateway 26 of LAN 14. Frame relay 16 operates in asynchronous transfer mode (ATM), which means that gateway 18 and gateway 26 may transmit data to each other whenever data is not being transmitted over frame relay 16, as opposed to requiring additional operating procedures to establish a data transmission path. Suitable communications media may be used instead of frame relay 16, including the public switched telephone network (PSTN), an integrated services digital network (ISDN), or other communications media operable to transfer data from gateway 18 of LAN 12 to gateway 26 of LAN 14.

Gateway 18 and gateway 26 are data processing devices that are operable to transfer data to frame relay 16 from twisted conductor pair 20 of LAN 12 and from twisted conductor pair 32 of LAN 14, respectively. Gateway 18 includes gateway operating system 34, which is a software application that operates on gateway 18. Gateway operating system 34 is functional to transfer data to and from and otherwise interact with software systems that operate on file server 22, client node 24, or other equipment coupled to twisted conductor pair 20. Gateway 26 includes gateway operating system 36, which is a software application that operates on gateway 26. Gateway operating system 36 is functional to transfer data to and from and otherwise interact with file server 28 and client node 30, or other equipment coupled to twisted conductor pair 32. In operation, client node 24 and file server 22 of LAN 12 are functional to transfer data to client node 30 and file server 28 of LAN 14 over the data transmission pathway formed by twisted conductor pair 20, gateway 18, frame relay 16, gateway 26, and twisted conductor pair 32.

Twisted conductor pair 20 is a communications medium used for transferring data between components in LAN 12. Other communications media may be used instead of twisted conductor pair 20, such as a coaxial cable, a fiber optic conductor, or other suitable communications media having a large data transfer bandwidth. Likewise, twisted conductor pair 32 may comprise a coaxial cable, a fiber optic conductor, or other suitable communications media having a large data transfer bandwidth.

Client node 24 comprises data processing equipment that includes a display 38, a keyboard 40, processor 42, and a disk drive 44. Display 38 is a visual interface that is used to present visual images including text and graphics for a user. The visual interface may also be a liquid crystal diode (LCD) display or other suitable visual interface devices. Display 38 couples to visual interface system 54 operating on processor 42, which supplies image data to display 38 from other systems. Client node 24 may include other suitable data processing equipment and peripheral devices.

Keyboard 40 couples to data entry system 46 operating on processor 42. Keyboard 40 is a data entry device that allows a user to enter data into processor 42 through data entry system 46. Keyboard 40 may also comprise suitable data entry devices that are operable to interface with data entry system 46, including an X–Y pointer device such as a mouse or trackball.

Processor 42 may comprise a personal computer having a microprocessor, random-access memory (RAM), and other typical components. Processor 42 may alternately comprise other suitable data processors, such as a workstation or a laptop computer, that are functional to operate and support program loader system 48, network interface system 50, data entry system 46, data storage system 52, and visual interface system 54. Processor 42 may include one or more microprocessors and various add-on modules such as network interface cards, printer cards, sound cards, CD-ROM drive interface cards, and modem cards.

Disk drive 44 is a data memory device that is operable to store digital data on a magnetic storage medium. Disk drive 44 may alternately comprise suitable data memory devices, such as a floppy disk, a tape storage drive, and an optical data storage device. Disk drive 44 couples to data storage system 52, and contains user-specific software application setup files 56.

Data entry system 46 is a software application that operates on processor 42 and couples to keyboard 40 and program loader system 48. Data entry system 46 is operable to receive data from keyboard 40 and to transmit the data to program loader system 48. Data entry system 46 may comprise suitable software applications operating on processor 42 that are functional to receive data from a data input device and transfer the data to other systems.

Network interface system 50 is a software application operating on processor 42 and couples to twisted conductor pair 20 and program loader system 48. Network interface system 50 is operable to transfer data to and from twisted conductor pair 20 and program loader system 48. Network interface system 50 may comprise suitable software applications operating on processor 42 that are functional to transfer data to and from twisted conductor pair 20 and program loader system 48.

Data storage system 52 is a software application operating on processor 42 and couples to disk drive 44 and program loader system 48. Data storage system 52 is operable to transfer data to and from disk drive 44 and program loader system 48. Data storage system 52 may comprise suitable software applications operating on processor 42 that are functional to transfer data to and from twisted conductor pair 20 and program loader system 48.

Program loader system 48 is a software application that operates on processor 42 and couples to network interface system 50, data storage system 52, data entry system 46, and visual interface system 54. Program loader system 48 may be one or more separate and discrete software applications, and is operable to allow a user of WAN 10 to operate software systems on processor 42 that may require user-specific software application setup files 56. The method of operation of program loader system 48 is described in detail in FIG. 2.

File server 22 is a personal computer having a microprocessor, RAM, and other typical components. A file server is a piece of data processing equipment that stores and processes files that may be used by multiple users on a network. For example, a file server may be used when users require access to a software application for a short period of time. File server 22 may comprise a variety of suitable data processors, such as a workstation, a microcomputer, or data processing equipment that is suited to operate as file server 22. File server 22 is functional to operate and support server network interface system 60, file server operating system 62, and file server data storage system 64. File server 22 may include one or more microprocessors and various add-on modules such as network interface cards, printer cards, sound cards, CD-ROM drive interface cards, and modem cards. One skilled in the art will recognize that other servers besides file server 22 may be used without departing from the spirit or scope of the present invention.

Disk drive 66 is a data memory device that is operable to store digital data on a magnetic storage medium, and is the same as or similar to disk drive 44. Disk drive 66 couples to file server data storage system 64, and contains user-specific software application setup files 56.

Server network interface system 60 is a software application that operates on file server 22 and couples to twisted conductor pair 20 and file server operating system 62. Server network interface system 60 is operable to transfer data between twisted conductor pair 20 and file server operating system 62. Server network interface system 60 may comprise suitable software applications operating on file server 22 that are operable to transfer data to and from twisted conductor pair 20 and file server operating system 62.

File server operating system 62 is a software application that operates on file server 22 and couples to server network interface system 60 and file server data storage system 64.

File server operating system 62 is operable to receive a request for user-specific software application setup files 56 from program loader system 48 through server network interface system 60, twisted conductor pair 20, and network interface system 50. File server operating system 62 is further operable to request user-specific software application setup files 56 from file server data storage system 64, and to transmit user-specific software application setup files 56 to program loader system 48 via server network interface system 60, twisted conductor pair 20, and network interface system 50.

File server data storage system 64 is a software application that operates on file server 22, and is operable to transfer user-specific software application setup files 56 to and from disk drive 66. File server data storage system 64 couples to disk drive 66 and file server operating system 62. File server data storage system 64 may comprise suitable data storage systems operable to transfer user-specific software application setup files 56 to and from disk drive 66.

File server 28 may comprise a personal computer having a microprocessor, RAM, and other typical components. File server 28 may comprise suitable data processors, such as a workstation, a microcomputer, or data processing equipment that is specially-designed to operate as file server 28. File server 28 is functional to operate and support server network interface system 68, file server operating system 70, and file server data storage system 72. File server 28 may include one or more microprocessors and various add-on modules such as network interface cards, printer cards, sound cards, CDROM drive interface cards, and modem cards.

Disk drive 74 is a data memory device that is operable to store digital data on a magnetic storage medium, and is the same as or similar to disk drive 44.

Disk drive 74 couples to file server data storage system 72, and contains user-specific software application setup files 56.

Server network interface system 68 is a software application that operates on file server 28 and couples to twisted conductor pair 32 and file server operating system 70. Server network interface system 68 is operable to transfer data to and from twisted conductor pair 32 and file server operating system 70. Server network interface system 68 may comprise suitable software applications operating on file server 28 that are operable to transfer data to and from twisted conductor pair 32 and file server operating system 70.

File server operating system 70 is a software application that operates on file server 28 and couples to server network interface system 68 and file server data storage system 72. File server operating system 70 functions to receive a request for user-specific software application setup files 56 from program loader system 48 over server network interface system 68. File server operating system 70 further functions to request user-specific software application setup files 56 from file server data storage system 72, and to transmit user-specific software application setup files 56 to program loader via server network interface system 68, twisted conductor pair 32, gateway 26, frame relay 16, gateway 18, twisted conductor pair 20, and network interface system 50.

File server data storage system 72 is a software application that operates on file server 28, and functions to transfer user-specific software application setup files 56 to and from disk drive 74. File server data storage system 72 couples to disk drive 74 and file server operating system 70. File server data storage system 72 may comprise suitable data storage systems operable to transfer user-specific software application setup files 56 to and from disk drive 74.

Client node 30 is a personal computer having a microprocessor, RAM, and other typical components. Client node 30 may comprise suitable data processors, such as a workstation or a laptop computer, that are operable to interface with twisted conductor pair 32 and disk drive 76, and that are further operable to run software applications. Client node 30 may include one or more microprocessors and various add-on modules such as network interface cards, printer cards, sound cards, CDROM drive interface cards, and modem cards.

Disk drive 76 is a data memory device that is operable to store digital data on a magnetic storage medium, and is the same as or similar to disk drive 44. Disk drive 76 couples to client node 30.

In operation, a user at client node 30 operates a software application that creates user-specific software application setup files. For example, a user at client node 30 may operate a software application that includes default menu settings, font settings, and color settings. These default settings may be stored on RAM of client node 30, disk drive 76, and on disk drive 74. The software application may also require other data, such as an individual user name, to be stored at a data memory location on RAM of client node 30, disk drive 76, and on disk drive 74.

If the user at client node 30 were to get on a plane and travel from her home client node, such as client node 30 in Dallas, Tex., to a remote client node, such as client node 24 in Houston, Tex., the user may be unable to run the software application at client node 24. Data stored on client node 30 and disk drive 76 may be unavailable if client node 30 is turned off. File server 28 may be unable to transfer data to a user at client node 24 because of network security configurations, hardware configurations, or other reasons. Unless the user can access all of the user-specific software application setup data needed to operate the software application at client node 24, the user will be unable to operate the software application.

Program loader system 48 of the present invention overcomes these problems by creating user-specific software application setup files 56. User-specific software application setup files 56 contain all of the setup programs, address data, and other related data necessary to allow a user at client node 30 to get on a plane and travel from client node 30 in Dallas, Texas to client node 24 in Houston, Texas, or any other client nodes coupled to WAN 10, and access the software application and setup files on client node 30. Program loader system 48 is operable to both create user-specific software application setup files 56, and to retrieve and process the data stored in user-specific software application setup files 56 when a user from client node 30 in Dallas, Tex. runs a software application on client node 24 in Houston, Tex. The function and operation of program loader system 48 is described in greater detail in FIG. 2.

Although the present invention has been described in FIG. 1 in regards to WAN 10, one skilled in the art will recognize that the network based program loader system and method of operation of the present invention may be implemented on a LAN without departing from the spirit and scope of the present invention. For example, the system and method of the present invention may be useful in a LAN application where users frequently utilize different client nodes.

FIG. 2 is a flowchart of the function and operation of a program loader system 48 constructed in accordance with teachings of the present invention. At step 80, a user from client node 30 of LAN 14 in Dallas, Tex., has traveled to Houston, Tex., and has logged in to LAN 12 at client node 24. Prior to traveling to Houston, the user has operated a software application such as a word processor application at client node 30, and in response to user input, the application software has created user-specific software application setup files 56 such as files that specify screen colors and default storage sites for documents. At client node 24, the user selects an application icon on display 38, such as for the word processor application, or otherwise enters a command to data entry system 46, using keyboard 40. Data entry system 46 transmits the command to program loader system 48.

At step 82, program loader system 48 operating on processor 42 of client node 24 transmits a request for user-specific software application setup files 56, such as files that specify screen colors and default storage sites for documents for a word processor application, to file server 28 of LAN 14 over network interface system 50, twisted conductor pair 20, gateway 18, frame relay 16, gateway 26, twisted conductor pair 32, and server network interface system 68. As previously mentioned, user-specific software application setup files 56 contain user-specific information on the particular application to be implemented with processor 42 of client node 24.

At step 84, file server operating system 70 operating on file server 28 retrieves user-specific software application setup files 56 from disk drive 74 via file server data storage system 72, and transmits user-specific software application setup files 56 to program loader system 48 at client node 24 via server network interface system 68, twisted conductor pair 32, gateway 26, frame relay 16, gateway 18, twisted conductor pair 20, and network interface system 50.

At step 86, program loader system 48 receives user-specific software application setup files 56, and at step 88, program loader system 48 swaps out existing data for the data in user-specific software application setup files 56. For example, program loader system 48 may retrieve data presently stored at predetermined locations in software application files stored on disk drive 44, RAM of processor 42, in files stored on disk drive 66 of file server 22, or in other suitable locations as required by the software application chosen by the user. The retrieved data is stored on disk drive 44 in prior software data file 58. Program loader system 48 then stores data from user-specific software application setup files 56 in the predetermined locations in software application files stored on disk drive 44, RAM of processor 42, in files stored on disk drive 66 of file server 22, or in any other suitable location as required by the software application chosen by the user.

For example, consider a software application that requires the user's name to be stored at a RAM memory address of processor 24, a setup file to be stored on disk drive 44, and a software directory on disk drive 66. Program loader system 48 first retrieves the present user's name stored at the RAM memory address of processor 24 and the setup file stored on disk drive 44, and creates prior software data file 58. Prior software data file 58 may include the address, directory, file name, or other information that defines where the data in prior software data file 58 was taken from. Program loader system 48 then retrieves data from user-specific software application data files 56 that corresponds to the user's name to be stored at the RAM memory address of processor 24, a setup file to be stored on disk drive 44, and a software directory on disk drive 66, and stores the appropriate data or creates the appropriate software directory. It should be noted in this regard that creation of a software directory is accomplished by storing data in a memory at a location where directory names and addresses are kept.

Software applications require modification of such files and storage of data prior to operating on processor 42. For example, certain software applications require the user's name to be present at a specific memory location or in a specific data file stored on disk drive 44, or at a specific address in RAM of processor 42. Other software applications may allow a user to specify default file locations, screen colors, menu configurations, or other user-specific options. While such software applications may prevent a user of client node 30 from using the software application at client node 24, program loader system 48 embodying concepts of the present invention overcomes this problem and allows a roaming user to operate such software systems with the user's resident defaults and specifications in place.

Program loader system 48 of the present invention resolves this problem by modifying the appropriate data files and data memory location in disk drive 44 and in RAM of processor 42 to place the required user-specific information where the software application requires. In addition, program loader system 48 of the present invention saves a copy of the previous configuration of the modified data memory locations as prior software data file 58. Thus, a user from client node 30 in Dallas, Tex. may use a software application such as a word processor application at client node 24 in Houston, Tex. with a user-specific setup without causing a permanent change to the operating system software setup configuration on client node 24. The user from Houston, Tex. who typically uses client node 24 will not experience any service problems resulting from the Dallas user's use of client node 24.

At step 90, program loader system 48 checks to determine if the software application requires the application of setup programs. Software applications require the execution of one or more setup programs on processor 42 of client node 24 prior to operation of the software application. For example, a word processor application may require execution of a file utility that moves a file handling system from disk drive 44 to RAM of processor 42. These setup programs, if required, may be included with user-specific software application setup files 56, or may be stored locally on disk drive 44 or disk drive 66. If these programs are required, they are executed at step 92 before proceeding to step 94. Otherwise, the method proceeds directly to step 94.

At step 94, program loader system 48 starts the software application, such as a word processor application. If the software application is resident on processor 42 of client node 24, then program loader system 48 activates the software application. Alternately, if the software application is stored on disk drive 66 of file server 22, program loader system 48 requests the software application from file server 22 via network interface system 50, twisted conductor pair 20, and server network interface system 60. Likewise, the software application may be stored on disk drive 44 of client node 24, such that program loader system 48 may request the software application from data storage system 52. One skilled in the art will recognize that suitable configurations may be used to store a software application without departing from the spirit or scope of the present invention.

At step 96, the user at client node 24 operates the software application on processor 42. During use of the software application on processor 42 by the user at client node 24, changes are made to the data that comprises user-specific software application setup files 56. For example, the user of a word processor application may alter menu choices, default directory locations, or other similar information. These changes will be made to software application setup files stored at various locations in disk drive 44, data at predetermined locations in RAM of processor 42, and to other predetermined data as may be required by the software application, such as files that specify screen colors and default storage sites for documents.

At step 98, the user at client node 24 terminates operation of the software application on processor 42 when use of the software application is completed. Program loader system 48 checks to determine if the software application has completed at step 100. If the application has not completed, the method returns to step 98 and awaits termination of the software application. After normal termination procedures, the method proceeds to step 102, where program loader system 48 retrieves the predetermined data required to form user-specific software application setup files 56 from RAM of processor 42, disk drive 44, disk drive 66, and other predetermined locations. Program loader system 48 then assembles user-specific software application setup files 56.

At step 104, program loader system 48 transmits user-specific software application setup files 56 to file server 28 via network interface system 50, twisted conductor pair 20, gateway 18, frame relay 16, gateway 26, twisted conductor pair 32, and server network interface system 68. Alternately, program loader system 48 may transmit user-specific software application setup files 56 to disk drive 66 and disk drive 44 in addition to file server 28, to increase the reliability of the system by allowing the user to access user-specific software application setup files 56 even when frame relay 16 is inoperable. At step 106, user-specific software application setup files 56 are stored on disk drive 74, and disk drive 44 and disk drive 66, if necessary. In addition, the data in prior software data file 58 is restored to its previous locations in order to allow the user of client node 24 in Houston, Texas to use client node 24 without any disruption of service.

Although the present invention has been described in detail, it should be understood that various changes, substitutions, and alterations can be made hereto without departing from the spirit and scope of the invention as defined by the appended claims.

What is claimed is:

1. A method for loading a software application for use at a client node of a network comprising the steps of:

activating a program loader system at the client node;

transmitting a user-specific software application setup file from a server to the client node, the user-specific software application setup file being associated with a user of the client node and being independent of the particular client node being used by the user; and loading an application at the client node using the user-specific software application setup file.

2. The method of claim 1 further comprising the steps of:

retrieving existing application data from predetermined locations in a client node data memory; and storing the existing application data in a prior software data file.

3. The method of claim 2 further comprising the steps of:

retrieving user-specific application data from the user-specific software application setup file; and storing the user-specific application data to the predetermined locations in the client node data memory.

4. The method of claim 3 further comprising the steps of:

running the software application at the client node; and modifying the user-specific application data stored at the predetermined locations in the client node data memory while operating the software application.

5. The method of claim 4 further comprising the steps of:

retrieving the modified user-specific application data from the predetermined locations in the client node data memory;

compiling a modified user-specific software application setup file from the modified user-specific application data; and storing the modified user-specific software application setup file at a server data memory.

6. The method of claim 2 wherein the step of retrieving existing application data comprises the step of retrieving existing application data from predetermined locations in a client node data memory, from predetermined locations in a server data memory, and from predetermined locations from a processor.

7. The method of claim 3 wherein the step of storing the user-specific application data comprises the step of storing the user-specific application data to predetermined locations in a client node data memory, to predetermined locations in a server data memory, and to predetermined locations from a processor.

8. The method of claim 4 wherein the step of modifying the user-specific application data comprises the step of modifying the user-specific application data stored at the predetermined locations in the client node data memory, the server data memory, and the processor while operating the software application.

9. The method of claim 5 wherein the step of storing the modified user-specific software application data file comprises the step of storing the modified user-specific software application data file at the client node data memory and at the server data memory.

10. A method for loading a software application for use at a client node of a network comprising the steps of:

activating a program loader system at the client node;

transmitting a user-specific software application setup file from a server to the client node, the user-specific software application setup file being associated with a user of the client node and being independent of the particular client node being used by the user;

retrieving existing application data from predetermined locations in a client node data memory;

storing the existing application data in a prior software data file;

retrieving user-specific application data from the user-specific software application setup file;

storing the user-specific application data to the predetermined locations in the client node data memory; and running the software application at the client node using the user-specific application data.

11. The method of claim 10 further comprising the steps of:

modifying the user-specific application data stored at the predetermined locations in the client node data memory while operating the software application;

retrieving the modified user-specific application data from the predetermined locations in the client node data memory;

compiling a modified user-specific software application setup file from the modified user-specific application data; and storing the modified user-specific software application setup file at a server data memory.

12. The method of claim 10 wherein the step of retrieving existing application data comprises the step of retrieving existing application data from predetermined locations in a client node data memory, from predetermined locations in a server data memory, and from predetermined locations from a processor.

13. (Amended) The method of claim 10 wherein the step of storing the user-specific application data comprises the step of storing the user-specific application data to predetermined locations in a client node data memory, to predetermined locations in a server data memory, and to predetermined locations from a processor.

14. The method of claim 11 wherein the step of modifying the user-specific application data comprises the step of modifying the user-specific application data stored at the predetermined locations in the client node data memory, the server data memory, and the processor while operating the software application.

15. The method of claim 11 wherein the step of storing the modified user-specific software application data file comprises the step of storing the modified user-specific software application data file at the client node data memory and at the server data memory.

16. A system for loading a software application for use at a client node coupled to a network comprising:

a user-specific software application setup file associated with a user of the client node and being independent of the particular client node being used by the user;

a server having a server data memory, the server coupled to the network and operable to store and retrieve the user-specific software application data file in the data memory;

a program loader system operating on the client node, the program loader system operable to retrieve the user-specific software application data file from the server and to apply parameters from the user-specific software application data file to the client node being used by the user.

17. The system of claim 16 further comprising:

a client data memory; and wherein the program loader system is further operable to store data from the user-specific software application data file at predetermined locations in the client data memory and the server data memory.

18. The system of claim 16 wherein the user-specific software application data file contains predetermined data and an associated data address.

19. The system of claim 16 further comprising:

a software application system operating on the client node; and wherein the program loader system is operable to activate the software application system.

20. The system of claim 16 further comprising:

a software application file stored on the server data memory; and wherein the program loader system is operable to request the software application file from the server and to install the software application file on the client node so as to create a software application system.

21. The system of claim 16 further comprising:

a software application file stored on the client data memory; and wherein the program loader system is operable to install the software application file from the client data memory so as to create a software application system.

22. The method of claim 4, further comprising:

retrieving the existing application data from the prior software data file; and restoring the existing application data to the predetermined locations in the client node memory.

23. The method of claim 10, further comprising:

retrieving the existing application data from the prior software data file; and restoring the existing application data to the predetermined locations in the client node memory.

* * * * *